Nov. 10, 1925.  H. A. PALLADY  1,561,016
SCRAPER
Filed Dec. 4, 1924

INVENTOR
Harry A Pallady
BY
Frank Warren
ATTORNEY

Patented Nov. 10, 1925.

1,561,016

UNITED STATES PATENT OFFICE.

HARRY A. PALLADY, OF SEATTLE, WASHINGTON, ASSIGNOR TO PAL-WELD MANUFACTURING COMPANY, OF SEATTLE, WASHINGTON.

SCRAPER.

Application filed December 4, 1924. Serial No. 753,826.

*To all whom it may concern:*

Be it known that I, HARRY A. PALLADY, a citizen of the United States, residing at Seattle, in the county of King and State of Washington, have invented a certain new and useful Improvement in Scrapers, of which the following is a specification.

My invention relates to improvements in scrapers that are adapted for scraping and smoothing the inner walls of cylinders and the object of my invention is to provide a scraper that will remove excess and protruding material evenly and smoothly from a cylinder wall without cutting into, scratching, scoring or otherwise injuring said cylinder wall.

Another object is to provide a scraper that is adapted to have its cutting element and its guiding elements adjustable to conform to the curvature of the walls of cylinders of different diameter.

A more specific object is to provide a scraper having two adjustable guard members having broad bearing surfaces that are arranged to rest against and slide upon the inner wall of a cylinder in such a manner as to hold an adjustable scraping knife in the correct scraping position and to prevent the scraper knife from scratching, scoring or cutting into the cylinder wall regardless of the position into which the scraper is turned or tilted.

A further object is to provide a scraper that is inexpensive to manufacture and simple in its plan of construction, that does not require a skilled operator to operate and that can not be caused to injure the cylinder wall when in operation.

Other and more specific objects will be apparent from the following description taken in connection with the accompanying drawings.

When an engine cylinder becomes scored or cracked they are sometimes repaired by filling the scores or cracks with molten metal, as with solder, which will ordinarily present a rough and protruding surface after it is allowed to harden. My scraper is adapted for scraping any excess solder from work of this nature and when the scraper is properly adjusted will leave the interior wall of a cylinder clean and smooth and can not be caused to injure the cylinder wall by an inexperienced operator.

I accomplish these objects by devices illustrated in the accompanying drawings, wherein Figure 1 is a view in perspective of a scraper constructed in accordance with my invention;

Figure 2:
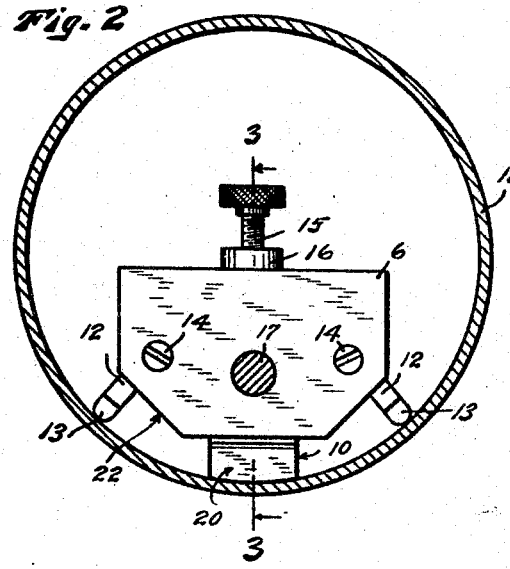
Fig. 2 is a plan view on a larger scale of the same showing the scraper in an operative position within a cylinder.
Figure 1:
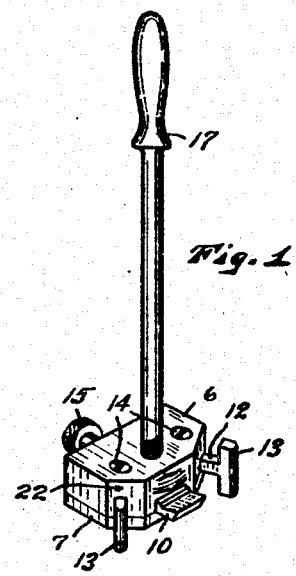
Figure 3:
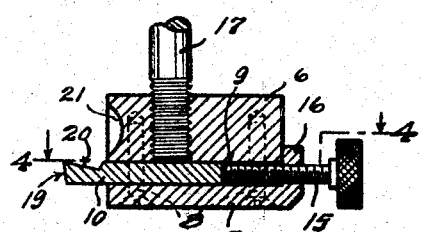
Fig. 3 is a sectional view on broken line 3, 3 of Fig. 2.
Figure 4:
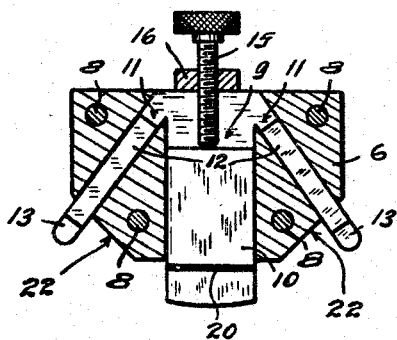
Fig. 4 is a sectional view on broken line 4, 4 of Fig. 3 showing parts in plan.
Figure 5:
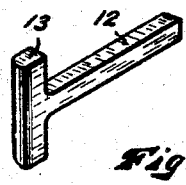
Fig. 5 is a detached view in perspective of one of the guard members of the device.

Referring to the drawings, throughout which like reference numerals indicate like parts, I have shown a body member or head block formed of a relatively thick upper plate 6 and a thinner lower plate 7, that may be rigidly secured together by screws 8.

One of the plates as the upper plate 6 is provided with a relatively wide transverse groove 9 for the reception of a knife or cutter member 10 and is further provided with two angular grooves 11 located on opposite sides of the knife groove 9 and are adapted to receive the shanks 12 of the guard members which terminate at their outer ends in relative long feet 13 that are adapted to bear upon the cylinder wall on both sides of the plane of the knife. The shanks 12 are slidable within the grooves 11 and are of square or rectangular cross-sectional shape and are arranged to be locked in adjusted positions in said grooves by means of the screws 14 in the plate 6.

A knife adjusting screw 15 is arranged to screw through a lug 16 at the rear edge of the head block and to abut against the rear end of said knife 10.

The knife 10 may be locked in position after it has been properly adjusted by screwing the end of a handle 17 securely down onto the top of the same.

The front edge of the knife is rounded to conform to the curvature of a cylinder 18 and is beveled as at 19 and the upper surface of such knife is ground at a slight angle as at 20 to form a better cutting or scraping edge.

The front edge of the head block 6 immediately above the knife blade is recessed as at 21 to afford ample clearance for the scrapings in case the knife 10 is adjusted so that it projects only a short distance beyond the surface of the block 6.

The corners of both plates 6 and 7 are beveled as at 22 to facilitate the operation of the scraper in a circular cylinder the guard members projecting outwardly from said beveled corner portions.

The handle 17 is long enough so that the device may be conveniently operated in an ordinary engine cylinder.

When the device is to be used the feet 13 of the guard members are first set so that when they are pressed evenly against the inner wall of the cylinder the forward edge of the head block will be in close proximity to, but clear of the cylinder wall. The handle 17 loosened slightly to leave the knife 11 free to move, the device is then placed within the cylinder with the guard members squarely upon the walls and the knife 11 is adjusted by turning the screw 15 until the cutting edge of such knife touches the cylinder wall. The handle 17 is then screwed securely down onto the knife and the device is ready for use.

In scraping and smoothing the cylinder wall the device is inserted into the cylinder with the knife at the location where the scraping is to be done and the guard members pressed firmly against the cylinder wall and is reciprocated thus causing the knife to cut or scrape off any foreign substance that protrudes beyond the inner cylinder wall and to leave such cylinder wall smooth and clean.

The guard members project both above and below the plane of the knife and are located one on each side of the knife so that if the device is turned at the wrong angle the knife will be lifted clear of the cylinder wall thereby making it impossible to cause the knife or any portion of the tool to scratch or dig into the cylinder wall. This feature is important because cylinder walls are easily scratched or scored in this manner and it requires considerable skill to scrape the same without injury with a tool that has no provision for safeguarding the cylinder wall. This device may be used successfully by a novice because it is practically impossible to cut too great a depth or to injure the cylinder wall with the same.

The knives are easily removable and may be furnished with different curvatures to suit cylinders of different diameters.

While the device is described as being especially adapted for scraping and smoothing engine cylinders after soldering it will be understood that the same may be used for removing any protruding or foreign substance from any cylindrical shaped device.

The foregoing description taken in connection with the drawings clearly disclose what I now consider to be the best embodiment of my invention but it will be understood that the disclosure is merely illustrative and that changes may be made without departing from the spirit of the invention.

What I claim is:

A scraper for scraping the inner walls of a cylinder embodying a head block, a handle on said block, a scraper knife projecting from said block, and two guard members held rigidly in said block and having bearing surfaces extending both forwardly and to the rear of the line of the scraping edge so as to govern the angle of the front face of the knife to the work and disposed on opposite sides of said knife and arranged to bear upon the cylinder wall on both sides of the plane of said knife whereby said knife may engage said cylinder only when said guard members rest squarely against said cylinder wall.

In witness whereof, I hereunto subscribe my name this 21st day of November A. D. 1924.

HARRY A. PALLADY.